United States Patent
Srinivas et al.

(10) Patent No.: US 8,310,929 B1
(45) Date of Patent: Nov. 13, 2012

(54) METHOD AND SYSTEM FOR CONTROLLING DATA RATES BASED ON BACKHAUL CAPACITY

(75) Inventors: Shilpa Kowdley Srinivas, Herndon, VA (US); Piyush Upadhyay, Overland Park, KS (US); Badri P. Subramanyan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 15 days.

(21) Appl. No.: 12/478,318

(22) Filed: Jun. 4, 2009

(51) Int. Cl.
*G01R 31/08* (2006.01)
*H04W 36/00* (2009.01)

(52) U.S. Cl. .......................... 370/232; 370/253; 455/436

(58) Field of Classification Search .................. 370/232, 370/252, 253, 329, 335, 336, 339, 341, 342, 370/350; 455/436–453, 456.1; 709/226, 709/229, 230, 231, 233
See application file for complete search history.

(56) References Cited

U.S. PATENT DOCUMENTS

| | | | |
|---|---|---|---|
| 5,649,299 A * | 7/1997 | Battin et al. ................... | 455/62 |
| 5,890,067 A | 3/1999 | Chang et al. | |
| 5,995,923 A | 11/1999 | Mermelstein et al. | |
| 6,014,568 A * | 1/2000 | Alperovich et al. ....... | 455/456.3 |
| 6,021,328 A * | 2/2000 | Curtis et al. ................... | 455/443 |
| 6,081,229 A | 6/2000 | Soliman et al. | |
| 6,148,207 A | 11/2000 | Baum | |
| 6,161,022 A | 12/2000 | Hwang et al. | |
| 6,172,974 B1 | 1/2001 | Tseng et al. | |
| 6,208,631 B1 | 3/2001 | Kim | |
| 6,223,041 B1 | 4/2001 | Egner et al. | |
| 6,243,590 B1 | 6/2001 | Reddy et al. | |
| 6,272,358 B1 | 8/2001 | Brent et al. | |
| 6,418,147 B1 | 7/2002 | Wiedeman | |
| 6,480,541 B1 | 11/2002 | Girod et al. | |
| 6,501,736 B1 | 12/2002 | Smolik et al. | |
| 6,522,888 B1 | 2/2003 | Garceran et al. | |
| 6,526,029 B1 | 2/2003 | Zhong | |
| 6,577,616 B1 | 6/2003 | Chaudry et al. | |
| 6,591,110 B1 | 7/2003 | Kim et al. | |
| 6,606,496 B1 | 8/2003 | Salvarani et al. | |
| RE38,244 E | 9/2003 | Han et al. | |

(Continued)

FOREIGN PATENT DOCUMENTS

WO    2004/004249    1/2004

(Continued)

OTHER PUBLICATIONS

Xin Liu et al., "Experiences in a 3G Network: Interplay between the Wireless Channel and Applications," MobiCom '08, Sep. 14-19, 2008.

(Continued)

*Primary Examiner* — Michael Thier
*Assistant Examiner* — Prince A Mensah (57) ABSTRACT

A femtocell base station determines the capacity of its backhaul connection by exchanging test packets with a test server. Based on the backhaul capacity that it determines, the femtocell base station selects a maximum forward link data rate and a maximum reverse link data rate for communications with a mobile station. The femtocell base station adjusts the forward-link rate algorithm used by the mobile station so as to prevent the mobile station from requesting a forward link data rate that exceeds the maximum forward link data rate. The femtocell base station may also adjust the reverse-link rate algorithm used by the mobile station so as to prevent the mobile station from transmitting at a data rate that exceeds the maximum reverse link data rate.

19 Claims, 6 Drawing Sheets

U.S. PATENT DOCUMENTS

| | | | |
|---|---|---|---|
| 6,625,119 B1 | 9/2003 | Schuster et al. | |
| 6,718,183 B1 | 4/2004 | Blust et al. | |
| 6,745,012 B1* | 6/2004 | Ton et al. | 455/67.13 |
| 6,757,520 B2 | 6/2004 | Attar | |
| 6,775,252 B1 | 8/2004 | Bayley | |
| 6,839,356 B2 | 1/2005 | Barany et al. | |
| 6,856,954 B1* | 2/2005 | Su | 704/212 |
| 6,944,454 B1 | 9/2005 | Lee et al. | |
| 6,970,437 B2 | 11/2005 | Lott et al. | |
| 6,970,871 B1 | 11/2005 | Rayburn | |
| 6,975,609 B1* | 12/2005 | Khaleghi et al. | 370/335 |
| 6,980,523 B1 | 12/2005 | Lipford et al. | |
| 7,058,124 B2 | 6/2006 | Koo | |
| 7,099,283 B2 | 8/2006 | Matta et al. | |
| 7,120,447 B1* | 10/2006 | Chheda et al. | 455/453 |
| 7,130,287 B2 | 10/2006 | Nounin et al. | |
| 7,130,311 B2 | 10/2006 | Yavuz et al. | |
| 7,139,274 B2 | 11/2006 | Attar | |
| 7,142,562 B2 | 11/2006 | Yavuz et al. | |
| 7,190,958 B1 | 3/2007 | Yarkosky | |
| 7,209,758 B1 | 4/2007 | Moll et al. | |
| 7,236,796 B2 | 6/2007 | Soliman | |
| 7,245,915 B2 | 7/2007 | Matta et al. | |
| 7,328,027 B1* | 2/2008 | Mangal | 455/453 |
| 7,394,789 B2* | 7/2008 | Sakawa et al. | 370/331 |
| 7,406,319 B2 | 7/2008 | Kostic et al. | |
| 7,411,923 B2* | 8/2008 | Attar et al. | 370/328 |
| 7,411,974 B2* | 8/2008 | Attar et al. | 370/465 |
| 7,426,180 B2 | 9/2008 | Xu | |
| 7,426,395 B2 | 9/2008 | Stephens | |
| 7,433,682 B1 | 10/2008 | Moll et al. | |
| 7,440,431 B2 | 10/2008 | Sindhushayana et al. | |
| 7,474,627 B2 | 1/2009 | Chheda et al. | |
| 7,486,645 B2* | 2/2009 | Li et al. | 370/335 |
| 7,496,058 B2 | 2/2009 | Kim et al. | |
| 7,602,722 B2 | 10/2009 | Chheda | |
| 7,729,243 B2 | 6/2010 | Ananthaiyer | |
| 7,742,768 B2 | 6/2010 | Liu et al. | |
| 7,746,816 B2 | 6/2010 | Attar et al. | |
| 7,751,839 B2 | 7/2010 | Bowers et al. | |
| 7,764,651 B2 | 7/2010 | Kwon | |
| 7,822,064 B2 | 10/2010 | Thubert | |
| 7,852,759 B2 | 12/2010 | Stephenson | |
| 7,894,488 B2 | 2/2011 | Shim | |
| 7,921,348 B2 | 4/2011 | Seidel et al. | |
| 7,953,048 B2 | 5/2011 | Yoon et al. | |
| 8,014,280 B2 | 9/2011 | Zhang et al. | |
| 8,040,803 B1 | 10/2011 | Pawar et al. | |
| 8,094,623 B2 | 1/2012 | Attar et al. | |
| 8,107,438 B1 | 1/2012 | Singh et al. | |
| 2002/0061749 A1 | 5/2002 | Hunzinger | |
| 2002/0151310 A1* | 10/2002 | Chung et al. | 455/452 |
| 2002/0191693 A1 | 12/2002 | Nakagaki | |
| 2003/0017831 A1 | 1/2003 | Lee et al. | |
| 2003/0064741 A1 | 4/2003 | Silva et al. | |
| 2003/0072278 A1* | 4/2003 | Wu et al. | 370/329 |
| 2003/0095551 A1 | 5/2003 | Gotoh | |
| 2003/0114172 A1 | 6/2003 | Soliman | |
| 2003/0117956 A1 | 6/2003 | Lee | |
| 2003/0123406 A1* | 7/2003 | Yavuz et al. | 370/333 |
| 2003/0129982 A1 | 7/2003 | Perini | |
| 2003/0163558 A1 | 8/2003 | Cao et al. | |
| 2003/0195006 A1* | 10/2003 | Choong et al. | 455/450 |
| 2004/0017860 A1 | 1/2004 | Liu | |
| 2004/0057420 A1 | 3/2004 | Curcio et al. | |
| 2004/0071086 A1* | 4/2004 | Haumont et al. | 370/230 |
| 2004/0109424 A1* | 6/2004 | Chheda | 370/331 |
| 2004/0179525 A1 | 9/2004 | Balasubramanian et al. | 370/391 |
| 2004/0196852 A1 | 10/2004 | Aksu et al. | |
| 2004/0202196 A1* | 10/2004 | Sindhushayana et al. | 370/465 |
| 2004/0213182 A1* | 10/2004 | Huh et al. | 370/332 |
| 2004/0218533 B1 | 11/2004 | Kim et al. | |
| 2004/0259565 A1 | 12/2004 | Lucidarme | |
| 2005/0032522 A1 | 2/2005 | Soong et al. | |
| 2005/0052996 A1 | 3/2005 | Houck et al. | |
| 2005/0111397 A1* | 5/2005 | Attar et al. | 370/319 |
| 2005/0130663 A1* | 6/2005 | Hong et al. | 455/445 |
| 2005/0153695 A1 | 7/2005 | Cho | |
| 2005/0159165 A1* | 7/2005 | Argyropoulos et al. | 455/452.2 |
| 2005/0201289 A1* | 9/2005 | Smolinske et al. | 370/236.1 |
| 2005/0250509 A1 | 11/2005 | Choksi | |
| 2005/0286440 A1 | 12/2005 | Strutt et al. | |
| 2006/0077994 A1 | 4/2006 | Spindola et al. | |
| 2006/0121855 A1 | 6/2006 | Dillon | |
| 2006/0126509 A1* | 6/2006 | Abi-Nassif et al. | 370/235 |
| 2006/0159045 A1* | 7/2006 | Ananthaiyer et al. | 370/329 |
| 2006/0159051 A1* | 7/2006 | English | 370/332 |
| 2006/0182062 A1 | 8/2006 | Sdralia et al. | |
| 2006/0223585 A1* | 10/2006 | Legg | 455/560 |
| 2006/0229087 A1 | 10/2006 | Davis, III et al. | |
| 2006/0250953 A1* | 11/2006 | Mooney et al. | 370/229 |
| 2006/0252429 A1 | 11/2006 | Chen et al. | |
| 2006/0268764 A1 | 11/2006 | Harris | |
| 2006/0291383 A1 | 12/2006 | Bi et al. | |
| 2007/0060165 A1 | 3/2007 | Black et al. | |
| 2007/0099648 A1 | 5/2007 | Kim et al. | |
| 2007/0109967 A1* | 5/2007 | Ha | 370/232 |
| 2007/0127407 A1* | 6/2007 | Attar et al. | 370/318 |
| 2007/0127522 A1* | 6/2007 | Lundh et al. | 370/468 |
| 2007/0133476 A1* | 6/2007 | Li et al. | 370/335 |
| 2007/0177510 A1* | 8/2007 | Natarajan et al. | 370/238 |
| 2007/0178906 A1 | 8/2007 | Gao et al. | |
| 2007/0183427 A1 | 8/2007 | Nylander et al. | |
| 2007/0197223 A1* | 8/2007 | Jung et al. | 455/436 |
| 2007/0201438 A1* | 8/2007 | Yoon et al. | 370/352 |
| 2007/0201439 A1 | 8/2007 | Sun et al. | |
| 2007/0274257 A1 | 11/2007 | Bae et al. | |
| 2008/0008093 A1* | 1/2008 | Wang et al. | 370/235 |
| 2008/0049699 A1 | 2/2008 | Li et al. | |
| 2008/0049706 A1 | 2/2008 | Khandekar et al. | |
| 2008/0080414 A1* | 4/2008 | Thubert et al. | 370/328 |
| 2008/0130495 A1* | 6/2008 | Dos Remedios et al. | 370/230 |
| 2008/0186862 A1 | 8/2008 | Corbett et al. | |
| 2008/0188228 A1* | 8/2008 | Pecen et al. | 455/449 |
| 2008/0207170 A1 | 8/2008 | Khetawat et al. | |
| 2008/0233967 A1* | 9/2008 | Montojo et al. | 455/452.2 |
| 2008/0247450 A1 | 10/2008 | Alexander | |
| 2008/0280615 A1 | 11/2008 | Vinayakray-Jani | |
| 2009/0059790 A1* | 3/2009 | Calvert et al. | 370/235 |
| 2009/0088157 A1 | 4/2009 | Aaron | |
| 2009/0141683 A1 | 6/2009 | Grinshpun et al. | |
| 2009/0170547 A1 | 7/2009 | Raghothaman et al. | |
| 2009/0187690 A1 | 7/2009 | Smart et al. | |
| 2009/0257361 A1 | 10/2009 | Deshpande et al. | |
| 2009/0262720 A1 | 10/2009 | Kwon et al. | |
| 2009/0285159 A1 | 11/2009 | Rezaiifar | |
| 2009/0288145 A1 | 11/2009 | Huber et al. | |
| 2010/0014487 A1 | 1/2010 | Attar et al. | |
| 2010/0189096 A1 | 7/2010 | Flynn et al. | |
| 2010/0240373 A1 | 9/2010 | Ji et al. | |
| 2010/0271962 A1 | 10/2010 | Han et al. | |
| 2010/0296407 A1 | 11/2010 | Medvedev et al. | |
| 2010/0309861 A1 | 12/2010 | Gorokhov et al. | |
| 2011/0053596 A1 | 3/2011 | Wohlert et al. | |
| 2011/0085607 A1 | 4/2011 | Dhandu et al. | |
| 2012/0044908 A1 | 2/2012 | Spinelli et al. | |

FOREIGN PATENT DOCUMENTS

WO 2004/028095 4/2004

OTHER PUBLICATIONS

Woon-Young Yeo et al., "Traffic management of high-speed CDMA systems based on load prediction," IEICE Electronics Express, vol. 6, No. 7, pp. 389-394, published Apr. 10, 2009.
U.S. Appl. No. 11/746,229, filed May 9, 2007, "Using VoIP-Quality Metrics to Dynamically Adjust the EV-DO Reverse Activity Bit".
U.S. Appl. No. 12/350,694, filed Jan. 8, 2009, "Using Packet-Transport Metrics for Call-Admission Control".
3rd Generation Partnership Project 2, "cdma2000 High Rate Packet Data Air Interface," 3GPP2 C.S0024-0, v. 4.0 (Oct. 2002).
3rd Generation Partnership Project 2, "cdma2000 High Rate Packet Data Air Interface," 3GPP2 C.S0024-A, v. 3.0 (Sep. 2006).
Emilio Mino et al., Information Society Technologies, "Integration of cooperation on Winner II System Concept," IST-4-027756 Winner II D4.8.3, Nov. 29, 2007.

U.S. Appl. No. 12/432,736, filed Apr. 29, 2009, "Using DRCLocks for Conducting Call Admission Control".
U.S. Appl. No. 12/397,855, filed Mar. 4, 2009, "Using Packet-Transport Metrics for Setting DRCLocks".
R. Ferrus et al., "Evaluation of a Cell Selection Framework for Radio Access Networks Considering Backhaul Resource Limitations," 18th Annual IEEE International Symposium on Personal, Indoor and Mobile Radio Communications (PIMRC), 2007.
"Method and System for Changing a Media Session Codec Before Handoff in a Wireless Network," U.S. Appl. No. 12/388,199, filed Feb. 18, 2009.
U.S. Appl. No. 12/141,569 filed Jun. 18, 2008.
U.S. Appl. No. 12/507,913, filed Jul. 23, 2009.
U.S. Appl. No. 12/494,999, filed Jun. 30, 2009.
U.S. Appl. No. 12/538,624, filed Aug. 10, 2009.
U.S. Appl. No. 12/756,629, filed Apr. 8, 2010.
U.S. Appl. No. 12/731,895, filed Mar. 25, 2010.
U.S. Appl. No. 11/746,229, Pre-Interview Communication dated Dec. 30, 2009.
U.S. Appl. No. 11/746,229, First Action Interview Summary dated Jun. 2, 2010.
U.S. Appl. No. 11/746,229, Notice of Allowance dated Aug. 3, 2010.
U.S. Appl. No. 11/746,229, Interview Summary dated Apr. 6, 2010.
U.S. Appl. No. 12/141,569, Non-Final Office Action dated Mar. 22, 2011.
U.S. Appl. No. 12/350,694, Non-Final Office Action dated Jun. 22, 2010.
U.S. Appl. No. 12/350,694, Final Office Action dated Dec. 9, 2010.
U.S. Appl. No. 12/350,694, Non-Final Office Action dated Feb. 18, 2011.
U.S. Appl. No. 12/350,694, Notice of Allowance mailed Jun. 10, 2011.
U.S. Appl. No. 12/397,855, Non-Final Office Action dated Oct. 12, 2010.
U.S. Appl. No. 12/397,855, Final Office Action dated Apr. 1, 2011.
U.S. Appl. No. 12/388,199, Non-Final Office Action dated Mar. 30, 2011.
Conklin, G. et al., "Video Coding for Streaming Media Delivery on the Internet," IEE Transactions on Circuits and Systems for Video Technology, 11(3):269-281 (Mar. 2001).
International Search Report and Written Opinion from International Application No. PCT/US2007/009296, dated Oct. 17, 2007.
U.S. Appl. No. 12/141,569, Notice of Allowance dated Sep. 28, 2011.
U.S. Appl. No. 12/388,199, Final Office Action dated Oct. 11, 2011.
U.S. Appl. No. 12/397,855, Non-Final Office Action dated Dec. 5, 2011.
U.S. Appl. No. 12/538,624, Final Office Action dated Dec. 19, 2011.
Kjellberg, Richard, "Analysis of an AIS Implementation in Tokyo Bay," web.archive.org/web/20090427053120/http://www.gpc.se/tokyo/tokyo.htm (Apr. 27, 2009).
Xing, Jianping et al., "Research and Integration of Marine Embedded AIS Information Terminal," Proceedings of the 7th World Congress on Intelligent Control and Automation, Jun. 25-27, 2008, Chongqing, China, pp. 3586-3589.

* cited by examiner

METHOD AND SYSTEM FOR CONTROLLING DATA RATES BASED ON BACKHAUL CAPACITY

BACKGROUND

Wireless communication networks are increasingly being used to provide wireless access to packet-switched networks, such as the Internet. For example, a mobile station may communicate with a base station via an air interface, and the base station may communication with the packet-switched network via a packet control function (PCF) and packet data serving node (PDSN). In this configuration, the mobile station may communicate with servers (such as Web servers, e-mail servers, media servers, gaming servers, etc.), other wireless communication devices, or other types of endpoints, via the packet-switched network.

To accommodate such packet data communications, various high data rate wireless communication protocols have been proposed. For example, several Evolution Data-Optimized (EVDO) standards within the cdma2000 family of standards have been proposed. Revision 0 of EVDO supports forward link data rates of up to about 2.46 Mbps and reverse link data rates of up to 153.6 kbps. Revision A of EVDO supports forward link data rates of up to about 3.07 Mbps and reverse link data rates of up to about 1.8 Mbps. Revision 0 is described in $3^{rd}$ Generation Partnership Project 2, "cdma2000 High Rate Packet Data Air Interface," 3GPP2 C.S0024-0, v. 4.0 (October 2002), which is incorporated herein by reference. Revision A is described in $3^{rd}$ Generation Partnership Project 2, "cdma2000 High Rate Packet Data Air Interface," 3GPP2 C.S0024-A, v. 3.0 (September 2006), which is incorporated herein by reference.

In the EVDO approach, a series of preset data rates are defined for the forward link and the reverse link. To receive data from the base station, the mobile station selects one of the preset forward link data rates (e.g., using a forward link rate selection algorithm) and requests the selected forward link data rate by transmitting a corresponding data rate control value (DRC value) in a data rate control channel (DRC channel). The base station may then transmit data to the mobile station at the requested forward link data rate. To transmit data to the base station, the mobile station selects one of the preset reverse link data rates (e.g., using a reverse link rate selection algorithm). The mobile station then transmits data to the base station at the selected reverse link data rate and also transmits an indication of the selected reverse link data rate in a return rate indication (RRI) channel.

OVERVIEW

In a first principal aspect, an exemplary embodiment provides a method for a wireless communication system in which a base station transmits data to a mobile station at forward link data rates that are requested by the mobile station and in which the base station is communicatively coupled to a packet-switched network via a backhaul connection. In accordance with the method, a capacity of the backhaul connection is determined. A maximum forward link data rate is selected based on the capacity. The base station controls the mobile station so as to prevent the mobile station from requesting a forward link date that exceeds the maximum forward link data rate.

In a second principal aspect, an exemplary embodiment provides a method for a mobile station. While being served by a first base station having a first backhaul capacity, the mobile station applies a first forward-link algorithm for selecting a forward link data rate from among a first set of forward link data rates. The mobile station moves into an area served by a second base station. The second base station has a second backhaul capacity that is less than the first backhaul capacity. While being served by the second base station, the mobile station applies a second forward-link algorithm for selecting a forward link data rate from among a second set of forward link data rates. The second set of forward link data rates is a subset of the first set of forward link data rates that compensates for the second backhaul capacity being less than the first backhaul capacity.

In a third principal aspect, an exemplary embodiment provides a base station comprising a transceiver, a backhaul interface, a backhaul compensator, and an air interface control function. The transceiver is configured to transmit forward-link data to a mobile station at forward link data rates requested by the mobile station and to receive reverse-link data transmitted by the mobile station at reverse link data rates. The backhaul interface is configured to receive the forward-link data via a backhaul connection and to transmit the reverse-link data via the backhaul connection. The backhaul compensator is configured to determine a capacity of the backhaul connection and to select a maximum forward link data rate based on the capacity. The air interface control function is configured to signal the mobile station via the transceiver, so as to prevent the mobile station from requesting forward link data rates that exceed the maximum forward link data rate.

DETAILED DESCRIPTION OF EXEMPLARY EMBODIMENTS

1. Introduction

The inventors have recognized that high data rate wireless communication protocols can lead to difficulties when employed by a base station that has a limited backhaul capacity. A macrocell base station typically has a high bandwidth backhaul connection. For example, a macrocell base station that supports Revision A of EVDO may be backed by a pair of T1 lines. Each T1 line has a bandwidth of about 1.54 Mbps. Thus, a pair of T1 lines may enable a macrocell base station to adequately support the maximum forward link data rate of 3.07 Mbps that is specified in Revision A.

However, base stations with smaller wireless coverage areas, such as femtocell base stations, may have much less backhaul capacity. For example, a femtocell base station in a residential location may use a digital subscriber line (DSL) or cable television (CATV) connection as a backhaul connection. That type of backhaul connection could have a download data rate that is less than 1 Mbps. Thus, a base station could have a backhaul connection that is unable to carry data at the maximum forward link data rates specified in Revision A and/or Revision 0 of EVDO. When a mobile station requests a forward link data rate that exceeds the download data rate of the base station's backhaul connection, the base station may compensate by buffering data received over the backhaul connection and, when sufficient data has accumulated, transmitting the buffered data at the requested forward link data rate. This buffering may increase latency, thereby adversely affecting the user experience. In addition, while the mobile station is waiting to receive the data that the base station is buffering, the mobile station may continue transmitting the DRC value corresponding to the requested forward link data rate in the DRC channel. This, in turn, may undesirably increase interference on the reverse link.

A low-capacity backhaul connection can also cause difficulties processing data transmitted by the mobile station. For example, a mobile station may transmit data to a base station at a reverse link data rate that exceeds the upload data rate of the base station's backhaul connection. As a result, the data from the mobile station may be received into the base station's reverse-link buffer more quickly than it can be transmitted through the base station's backhaul connection. When the reverse-link buffer becomes filled, the base station may begin to lose some of the data transmitted by the mobile station or may request the mobile station to re-transmit some of the data. In either case, the mobile station would be using the reverse link inefficiently.

To address these problems, the inventors propose a maximum forward link data rate and/or maximum reverse link data rate that is based on a base station's backhaul capacity. For example, a base station may determine a capacity of its backhaul connection, select a maximum forward link data rate and/or maximum reverse link data rate based on the capacity, and control the mobile station so as to prevent the mobile station from requesting a forward link data rate that exceeds the maximum forward link data rate and/or so as to prevent the mobile station from transmitting at a reverse link data rate that exceeds the maximum reverse link data rate.

In an exemplary embodiment, the base station determines the capacity of the backhaul connection through a testing process, for example, by exchanging test packets with a test server via the backhaul connection. The base station could perform this testing as part of an initial configuration of the base station. After initial configuration, the base station could conduct further testing (e.g., at preset time intervals, when a new mobile station registers, or at the instance of the user) in order to check for any changes in the capacity of the backhaul connection. For example, a backhaul connection for a femtocell base station in a user's residence may be part of a local area network that also carries data traffic for the user's other devices. This sharing of the backhaul connection may reduce the effective capacity of the backhaul connection that is available to the base station.

From this testing, the base station may determine a supportable data rate that is within the capacity of the backhaul connection. The base station may then select a maximum forward link data rate based on this supportable data rate. For wireless communication protocols that have preset forward link data rates (e.g., EVDO), the base station may select as the maximum forward link data rate the highest preset forward link data rate that is less than or equal to the supportable data rate. The base station may select a maximum reverse link data rate in a similar manner.

The base station may then adjust the algorithms used by the mobile station to select forward-link and reverse-link data rates. More particularly, the base station may adjust the forward-link rate algorithm so as to prevent the mobile station from requesting a forward link data rate that exceeds the maximum forward link data rate, and the base station may adjust the reverse-link rate algorithm so as to prevent the mobile station from using a reverse link data rate that exceeds the maximum reverse link data rate.

In this way, a base station may limit forward-link and/or reverse-link data rates so as to compensate for the base station's limited backhaul capacity.

2. Exemplary Network Architecture

Figure 1:
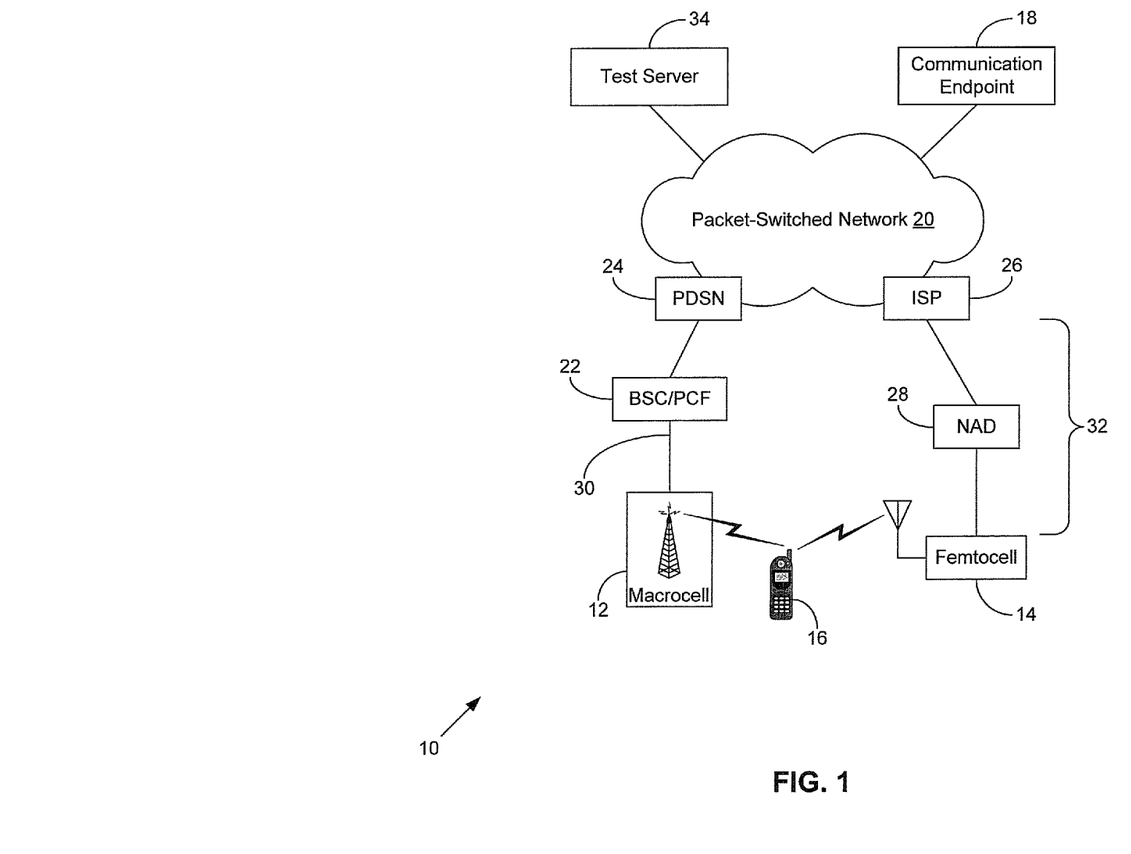
FIG. 1 is a block diagram of a wireless telecommunications network, in accordance with an exemplary embodiment.

FIG. 1 illustrates a wireless telecommunications network 10 in which exemplary embodiments may be employed. Network 10 may include different base stations that provide wireless coverage in areas of different sizes. For example, network 10 may include one or base stations that provide the wireless coverage in a relatively large area, such as a macrocell. Network 10 may also include one or more base stations that provide wireless coverage in smaller areas, such as microcells, picocells, or femtocells.

For purposes of illustration, FIG. 1 shows network 10 with a macrocell base station 12 and a femtocell base station 14. Macrocell base station 12 provides wireless coverage in a larger area than provided by femtocell base station 14. For example, macrocell base station 12 might provide wireless coverage for a city, part of a city, along a highway, or in one or more townships in rural areas. In contrast, femtocell base station 14 might provide wireless coverage in one or more rooms in a residence or office building. The wireless coverage areas provided by macrocell base station 12 and femtocell base station 14 could be either overlapping or non-overlapping. Although FIG. 1 shows only base stations 12 and 14 for purposes of illustration, it is to be understood that network 10 could include a greater number of macrocell base stations and/or femtocell base stations, as well as microcell, picocell, or other types of base stations.

Within their respective coverage areas, macrocell base station 12 and femtocell base station 14 can communicate with wireless devices, such as mobile station 16. Mobile station 16 could be a wireless telephone, wireless personal digital assistant, wirelessly-equipped notebook computer, or other type of wireless communication device. The communications between mobile station 16 and base stations 12 and 14 may use a wireless communication protocol, such as 1xRTT CDMA, EVDO, GSM/GPRS, WiMAX (IEEE 802.16), or WiFi (IEEE 802.11). Base stations 12 and 14 could use either the same or different protocols for wireless communications.

Within their respective coverage areas, base stations 12 and 14 may enable wireless devices, such as mobile station 16, to communicate with various types of communication endpoints, exemplified in FIG. 1 by communication endpoint 18. When communicating with endpoint 18, mobile station 16 might exchange voice, video, data, or other media macrocell base station 12 and/or femtocell base station 14. Thus, endpoint 18 could be a landline telephony device, such as an analog telephone or voice-over-packet (VoP) device, or a wireless device, such as another mobile station. Alternatively, endpoint 18 could be a server, such as a Web server, e-mail server, instant messaging server, streaming media server, or gaming server. Mobile station 16 may communicate with endpoint 18 via either a circuit-switched network or a packet-switched network. For purposes of illustration, FIG. 1 shows endpoint 18 communicatively coupled to a packet-switched network 20.

Macrocell base station 12 and femtocell base station 14 may access packet-switched network 20 in different ways. For example, macrocell base station 12 may be communicatively coupled to a base station controller (BSC) and packet control function (PCF), exemplified in FIG. 1 as BSC/PCF 22. BSC/PCF 22 may, in turn, communicate with packet-switched network 20 via a packet data serving node (PDSN) 24.

Femtocell base station 14 may have a different type of connection with packet-switched network 20. For example, femtocell base station 14 may be located in a subscriber's residence and may use the subscriber's Internet service provider (ISP) 26 to access packet-switched network 20. The subscriber's Internet access may be provided by, for example, a cable television connection or a digital subscriber line (DSL). Thus, femtocell base station 14 may be communicatively coupled to a network access device (NAD) 28 (e.g., a cable modem or DSL modem) that communicates with packet-switched network 20 via ISP 26.

Base stations 12 and 14 may have respective backhaul connections for sending and receiving data that is carried over packet-switched network 20. For example, macrocell base station 12 may have a backhaul connection 30 to BSC/PCF 22, and femtocell base station 14 may have a backhaul connection 32 to ISP 26. Backhaul connection 30 could be, for example, a pair of T1 lines. Alternatively, backhaul connection 30 could be provided by a wireless communication link. It is also to be understood that backhaul connection 30 could include multiple segments, such as one or more wired links (such as T1 lines) and/or one or more wireless link (such as point-to-point microwave links). However it is configured, backhaul connection 30 may have an effective bandwidth that limits the data rate between macrocell base station 12 and packet-switched network 20.

The capacity of backhaul connection 32 may similarly limit the data rate between femtocell base station 14 and packet-switched network 20. The capacity of backhaul connection 32 may be affected by various factors, including the subscriber's service plan with ISP 22, the type of NAD 28, the type of connection between femtocell 14 and NAD 28 (e.g., whether a USB or Ethernet connection is used), and the presence of other data traffic.

Backhaul connection 32 may have less capacity than backhaul connection 30, to the point where the wireless performance of femtocell base station 14 is affected by the limited capacity of its backhaul connection. To compensate for possible backhaul limitations, femtocell base station 14 may determine the capacity of backhaul connection 32 by exchanging test packets with a test server 34. The tests may determine an upload data rate for sending data to test server 34 and/or a download data rate for receiving data from test server 34. The upload and download data rates of backhaul connection 34 may be different, as ISPs commonly offer service plans that provide download data rates that are higher than the upload data rates.

As described in more detail below, femtocell base station 14 may limit the data rate used for communicating with wireless devices, such as mobile station 16, based on the capacity of backhaul connection 32 that is determined from these tests. For example, femtocell base station 14 may limit the forward-link data rate based on the download data rate of backhaul connection 32 and/or may limit the reverse-link data rate based on the upload data rate of backhaul connection 32.

3. Exemplary Femtocell Base Station

Figure 2:
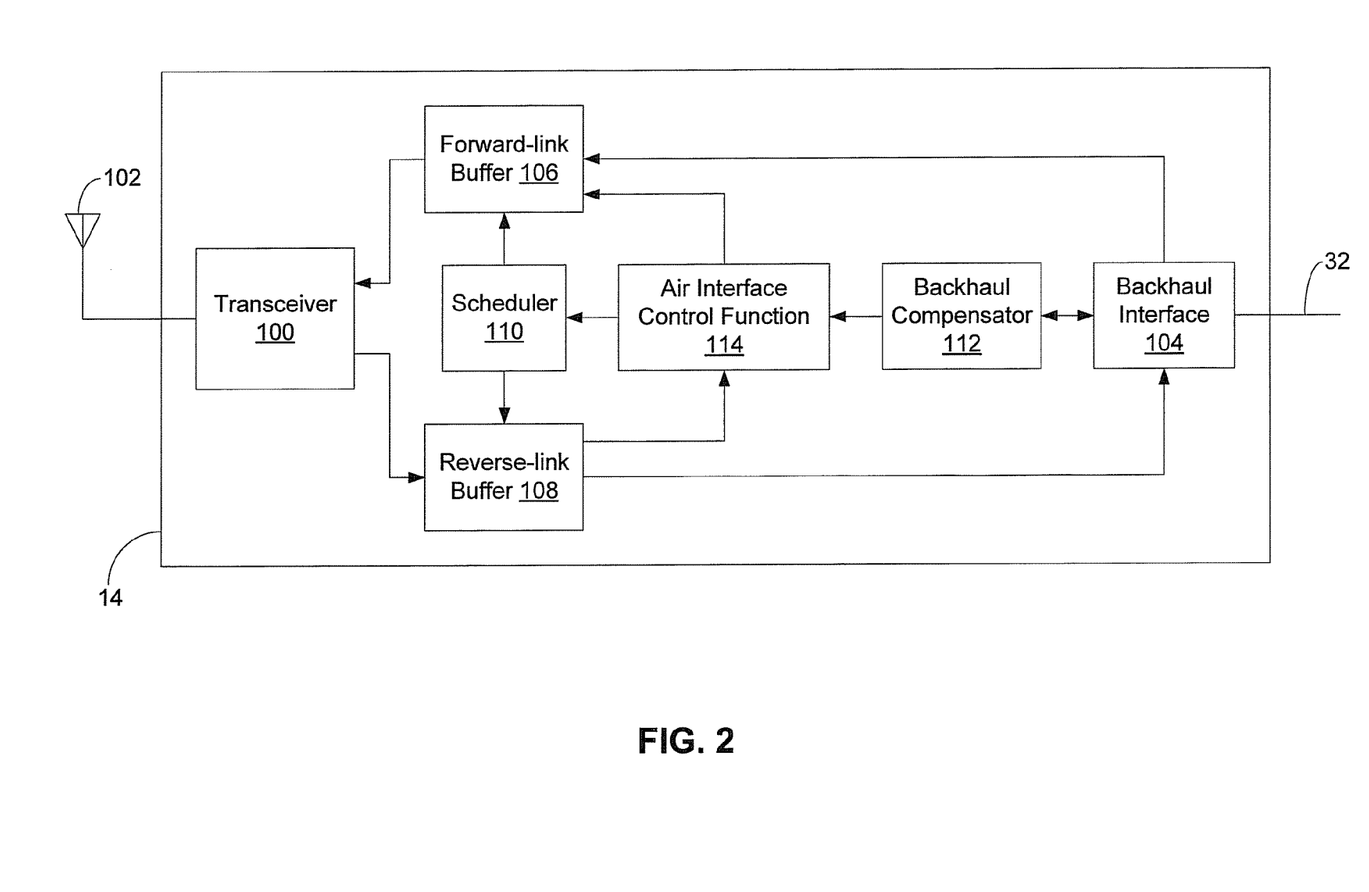
FIG. 2 is a block diagram of a femtocell base station, in accordance with an exemplary embodiment.

FIG. 2 illustrates an exemplary configuration for femtocell base station 14. The example of FIG. 2 is described with reference to EVDO. It is to be understood, however, that similar configurations could be used for other wireless communication protocols.

Femtocell base station 14 includes a transceiver 100 that is configured to transmit forward-link data to and receive reverse-link data from mobile stations, such as mobile station 16, via an antenna 102. In compliance with EVDO protocols, transceiver 100 may transmit the forward-link data to a mobile station at a data rate corresponding to a data rate control (DRC) value that the mobile station transmits in a DRC channel. In addition, transceiver 100 may receive data from the mobile station at a data rate identified by a reverse rate indicator (RRI) transmitted by the mobile station.

Femtocell base station 14 also includes a backhaul interface 104 that is configured to receive data from and transmit data over backhaul connection 32. The data received by backhaul interface 104 may accumulate in a forward-link buffer 106 for transmission to the mobile station by transceiver 100. The data received by transceiver 100 may accumulate in a reverse-link buffer 108 for transmission over backhaul connection 32 by backhaul interface 104.

A scheduler 110 may schedule the transmission of data in forward-link buffer 106 through transceiver 100 and the transmission of data in reverse-link buffer 108 through backhaul interface 104. More particularly, scheduler 110 may schedule the transmission of data in forward-link buffer 106 so as to achieve the forward-link data rate requested by the wireless device. Scheduler 110 may also schedule the transmission of data in reverse-link buffer 108 through backhaul interface 104 so as to try to keep the occupancy of reverse-link buffer 108 within specified limits. However, difficulties can arise due to the limited capacity of backhaul connection 32.

If the requested forward-link data rate is higher than the rate at which data accumulates in forward-link buffer 106 (e.g., because the requested forward-link data rate is higher than the download rate of backhaul connection 32), then forward-link buffer 106 may become depleted. When this occurs, scheduler 110 may wait until sufficient data accumulates in forward-link buffer 106 before scheduling another transmission through transceiver 100, thereby adding undesirable latency.

If the reverse-link data rate is higher than the rate at which data can be transmitted through backhaul connection 104 (e.g., because the reverse-link data rate is higher than the upload data rate of backhaul connection 32), then reverse-link buffer 108 may become completely full. When this occurs, additional reverse-link data received by transceiver 100 may be lost, and femtocell base station 14 may request the wireless device to re-transmit the lost data.

To avoid such problems, femtocell base station 14 may include a backhaul compensator 112 that is configured to determine a capacity of backhaul connection 32 and to select a maximum forward-link data rate and/or maximum reverse-link data rate based on that capacity. For example, backhaul compensator 112 may exchange packets with test server 34 to determine a download data rate and an upload data rate through backhaul connection 32, which backhaul compensator 112 may then use to determine the maximum forward-link data rate and reverse-link data rate, respectively.

In addition, femtocell base station 14 may include an air interface control function 114 that is configured to send signals to a mobile station communicating with femtocell base station 14 that prevent the mobile station from (i) requesting a forward-link data rate that exceeds the maximum forward-link data rate and/or (ii) transmitting at a reverse-link data rate exceeds the maximum reverse-link data rate. More particularly, air interface control function 114 may control the forward-link rate algorithm used by the mobile station for selecting forward-link data rates and/or the reverse-link rate algorithm used by the mobile station for selecting reverse-link data rates.

4. Exemplary Methods of Operation

Figure 3:
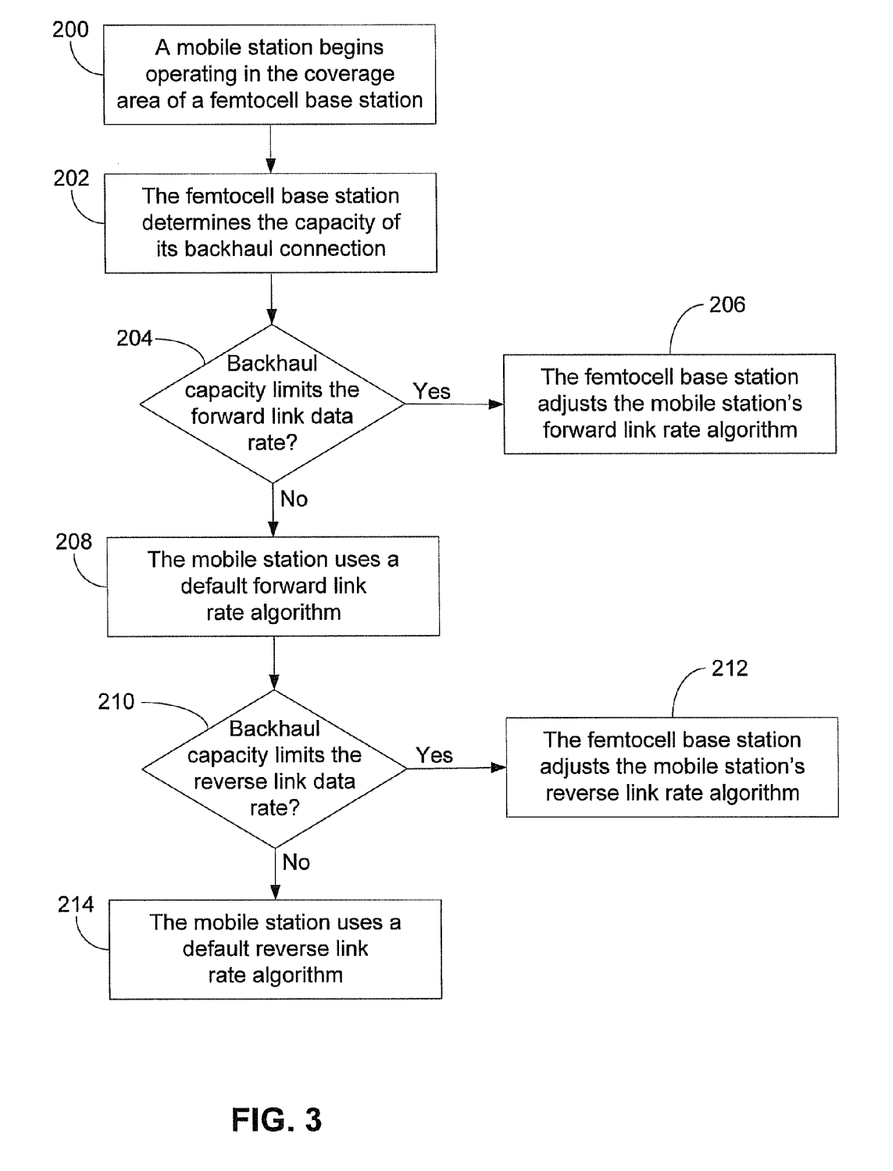
FIG. 3 is a flow chart for a method of assessing the effects of a base station's backhaul capacity, in accordance with an exemplary embodiment.
Figure 4:
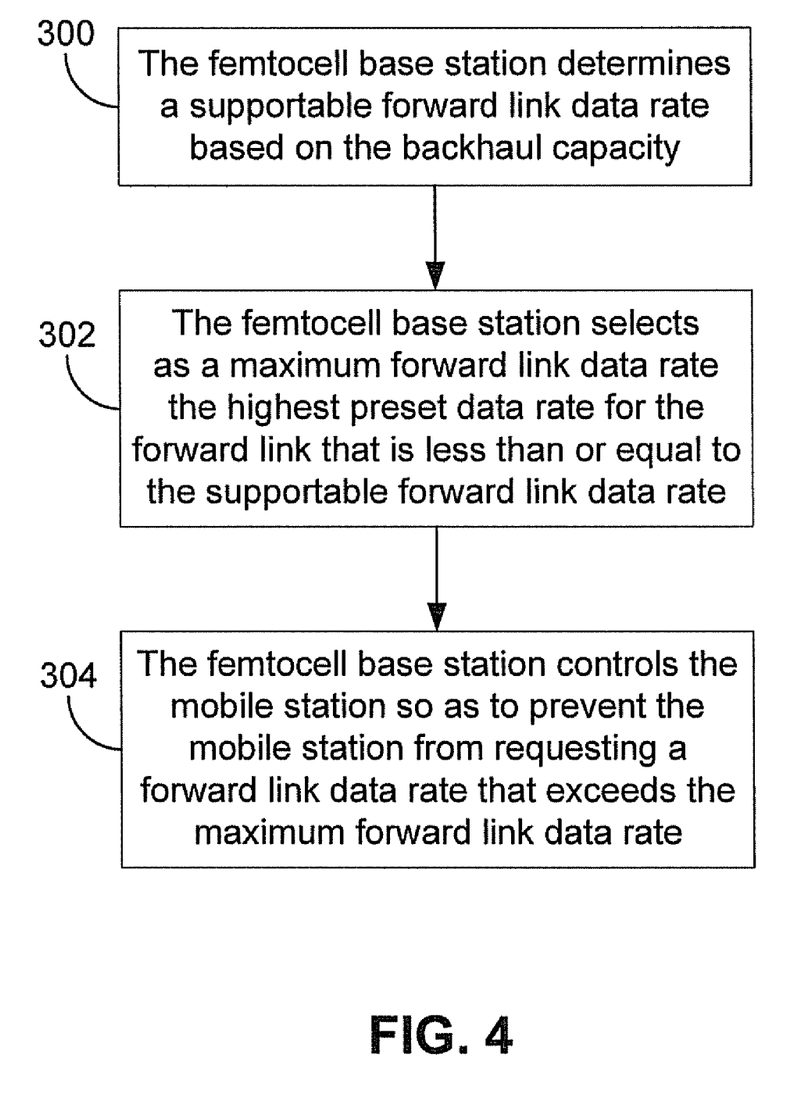
FIG. 4 is a flow chart for a method of adjusting a mobile station's forward-link rate selection algorithm, in accordance with an exemplary embodiment.
Figure 5:
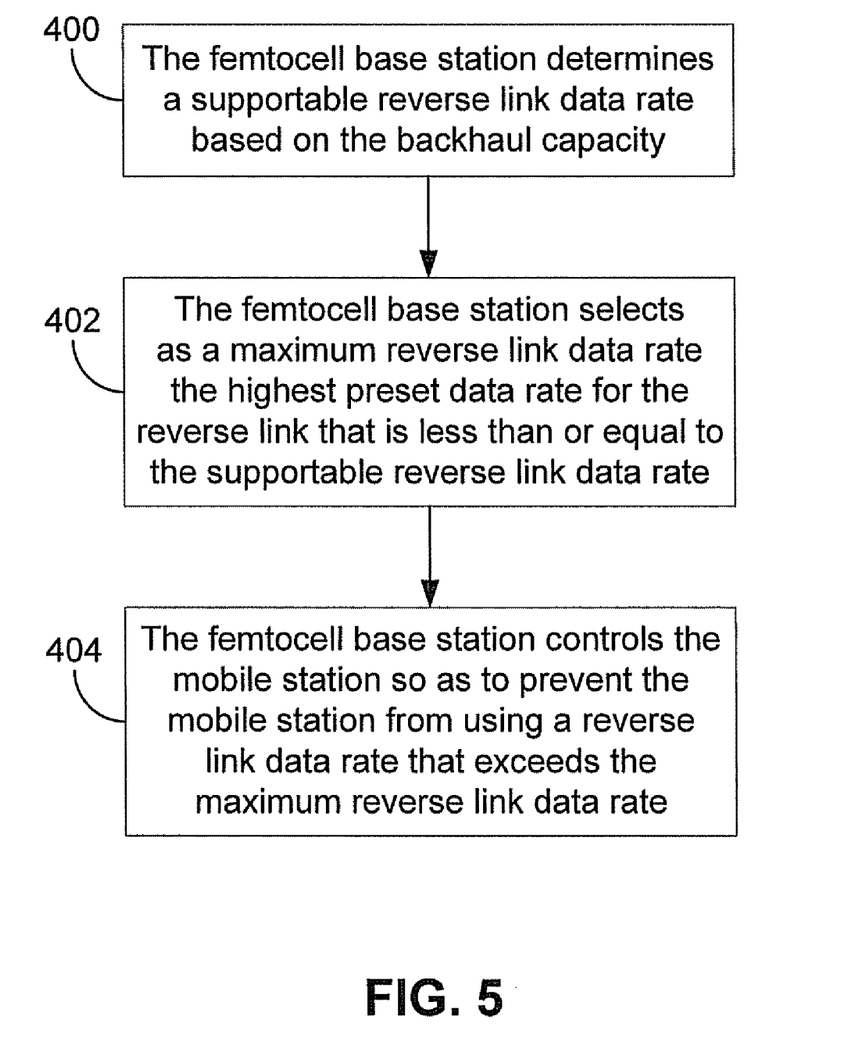
FIG. 5 is a flow chart for a method of adjusting a mobile station's reverse-link rate selection algorithm, in accordance with an exemplary embodiment.

FIGS. 3-5 illustrates exemplary methods that can be used to limit forward link and/or reverse link data rates based on backhaul capacity. FIGS. 3-5 are described with reference to a femtocell base station (e.g., femtocell base station 14). It is to be understood, however, that the methods could also be applied to other types of base stations (e.g., picocell, microcell, or macrocell base stations). In addition, the methods are described with reference to EVDO. However, the methods could be applied to other wireless communication protocols.

With reference to FIG. 3, a mobile station begins operating in the coverage area of a femtocell base station, as indicated by block 200. In this example, the mobile station and femtocell base station communicate using a wireless communication protocol such as Revision 0 or Revision A of EVDO.

The femtocell base station may then determine the capacity of its backhaul connection, as indicated by block 202. The femtocell base station could do this, for example, by exchanging test packets with a test server. Alternatively, the femtocell base station may have already determine the capacity of its backhaul connection beforehand. For example, the backhaul capacity could be determined periodically or could be determined as part of the initial configuration of the femtocell base station.

The femtocell base station may determine whether the backhaul capacity limits the forward link data rate, as indicated by block 204. To make this determination, the femtocell base station may compare the download data rate through its backhaul connection, D, to the highest forward link data rate supported by the wireless communication protocol, $F_H$, multiplied by a forward-link bias factor, $B_F$.

If $D<B_F(F_H)$, then backhaul capacity may be deemed limiting, and the femtocell base station may adjust the mobile station's forward link rate algorithm, as indicated by block 206. As described in more detail below, the adjustment may prevent the mobile station from requesting the highest forward-link data rate (e.g., by limiting the mobile station to only a subset of wireless protocol's forward link data rates). Otherwise, the mobile station may use a default forward link rate algorithm, as indicated by block 208. With the default algorithm, the mobile station could still request the $F_H$ forward-link data rate.

For EVDO Rev. 0, $F_H$ is about 2.46 Mbps. For EVDO Rev. A, $F_H$ is about 3.07 Mbps. The forward-link bias factor, $B_F$, may be selected so as to make limitations on the forward link data rate either more or less likely. For example, $B_F$ could be a number from about 1.0 to about 2.0, in which case the download data rate through the backhaul connection must either equal or exceed $F_H$ by a sufficient amount in order for the highest forward link data rate to be available to the mobile station.

The femtocell base station may also determine whether the backhaul capacity limits the reverse link data rate, as indicated by block 210. To make this determination, the femtocell base station may compare the upload data rate through its backhaul connection, U, to the highest reverse link data rate supported by the wireless communication protocol, $R_H$, multiplied by a reverse-link bias factor, $B_R$.

If $U<B_R(R_H)$, then backhaul capacity may be deemed limiting, and the femtocell base station may adjust the mobile station's reverse link rate algorithm, as indicated by block 212. As described in more detail below, the adjustment may prevent the mobile station from transmitting at the highest reverse-link data rate (e.g., by limiting the mobile station to only a subset of wireless protocol's reverse link data rates). Otherwise, the mobile station may use a default reverse link rate algorithm, as indicated by block 214. With the default algorithm, the mobile station could still request the $R_H$ reverse-link data rate.

For EVDO Rev. 0, $R_H$ is about 153.6 kbps. For EVDO Rev. A, $R_H$ is about 1.8 Mbps. The reverse-link bias factor, $B_R$, may be selected so as to make limitations on the forward link data rate either more or less likely. For example, $B_R$ could be a number from about 1.0 to about 2.0, in which case the upload data rate through the backhaul connection must either equal or exceed $R_H$ by a sufficient amount in order for the highest reverse link data rate to be available to the mobile station.

The forward link rate algorithm that the mobile station uses to determine what forward-link data to request may involve an algorithm for selecting a DRC value based on the forward-link conditions and a mapping between the DRC values and the forward-link data rates. The forward-link conditions could be determined based on a signal-to-interference-and-noise ratio (SINR) or a carrier-to-interference-and-noise ratio (CINR) measured by the mobile station. For EVDO Rev. 0, each DRC value maps to a preset data rate and packet length, as shown below in Table 1:

TABLE 1

| DRC Value | Data rate (kbps) | Packet length (slots) |
|---|---|---|
| 0 | Null Rate | N/A |
| 1 | 38.4 | 16 |
| 2 | 76.8 | 8 |
| 3 | 153.6 | 4 |
| 4 | 307.2 | 2 |
| 5 | 307.2 | 4 |
| 6 | 614.4 | 1 |
| 7 | 614.4 | 2 |
| 8 | 921.6 | 2 |
| 9 | 1228.8 | 1 |
| 10 | 1228.8 | 2 |
| 11 | 1843.2 | 1 |
| 12 | 2457.6 | 1 |

For EVDO Rev. A, the forward-rate algorithm is more complicated, as each DRC value is associated with anywhere from one to four possible data rates. Thus, a DRC value in combination with other parameters, such as packet size and nominal transmission duration, maps to a particular data rate. In addition, EVDO Rev. A specifies a total of 15 DRC values, with a DRC value of 14 corresponding to the highest forward-link data rate of 3.072 Mbps.

Adjusting the forward-link rate algorithm used by the mobile station may involve the femtocell base station determining a maximum forward link data rate that will be available to the mobile station and then changing the mapping between DRC values and forward-link data rates so that the mobile station is not able to request a forward-link data rate that exceeds the maximum forward link data rate. FIG. 4 illustrates an exemplary method for adjusting the forward-link rate algorithm in this way.

In this exemplary method, the femtocell base station determines a supportable forward link data rate based on the backhaul capacity, as indicated by block 300. The supportable forward link data rate may be taken as a percentage of the download data rate that was determined for the backhaul connection. The percentage could, for example, correspond to the inverse of the forward-link bias factor, $B_F$ (i.e., a percentage from about 50% to about 100%). Thus, for a download data rate of 1.5 Mbps, the supportable data rate may be taken as 750 kbps.

The femtocell base station then selects as a maximum forward link data rate the highest preset data rate that is less than or equal to the supportable data rate, as indicated by block 302. For example, suppose the supportable data rate is 750 kbps. According to Table 1, the highest preset data rate in EVDO Rev. 0 (for the forward link) that does not exceed the supportable data rate would be 614.4 kbps. Thus, the maximum forward link data rate would be selected as 614.4 kbps.

The femtocell base station then controls the mobile station so as to prevent the mobile station from requesting a forward link data rate that exceeds the maximum forward link data rate, as indicated by block 304. To do this, the femtocell base station may change the mapping between DRC values and forward link data rates, so that the DRC values do not map to any data rate higher than the maximum forward link data rate. For example, if the femtocell base station selects a maximum forward link data rate of 614.4 kbps, than the femtocell base station may signal the mobile station to use a mapping in which 614.4 kbps is the highest forward link data rate. As a result, the mobile station might use a mapping as shown in Table 2:

TABLE 2

| DRC Value | Data rate (kbps) | Packet length (slots) |
|---|---|---|
| 0 | Null Rate | N/A |
| 1 | 38.4 | 16 |
| 2 | 76.8 | 8 |
| 3 | 153.6 | 4 |
| 4 | 307.2 | 2 |
| 5 | 307.2 | 4 |
| 6 | 614.4 | 1 |
| 7 | 614.4 | 2 |
| 8 | 614.4 | 2 |
| 9 | 614.4 | 2 |
| 10 | 614.4 | 2 |
| 11 | 614.4 | 2 |
| 12 | 614.4 | 2 |

In this way, the mobile station may continue to select DRC values based on RF conditions as before, but the mapping of DRC values to forward link data rates in the adjusted algorithm may be different than in the mobile station's default algorithm. For example, only a subset of the preset data rates (i.e., the preset data rates that are less than or equal to the maximum forward link data rate) may be available in the adjusted mapping.

The reverse-link rate algorithm could be adjusted in a similar manner, as illustrated in FIG. 5. The femtocell base station determines a supportable reverse link data rate based on the backhaul capacity, as indicated by block 400. The supportable reverse link data rate may be taken as a percentage of the upload data rate that was determined for the backhaul connection. The percentage could, for example, correspond to the inverse of the reverse-link bias factor, $B_R$ (i.e., a percentage from about 50% to about 100%). Thus, if the upload data rate for the backhaul connection was found to be 100 kbps, then the supportable reverse link data rate could be taken as 50 kbps.

The femtocell base station then selects as a maximum reverse link data rate the highest preset data rate for the reverse link that is less than or equal to the supportable reverse link data rate, as indicated by block 402. With respect to preset data rates, EVDO Rev. 0 specifies five different reverse-link data rates, as summarized below in Table 3:

TABLE 3

| Reverse Rate Index (RRI) | Data rate (kbps) |
|---|---|
| 1 | 9.6 |
| 2 | 19.2 |
| 3 | 38.4 |
| 4 | 76.8 |
| 5 | 153.6 |

For example, suppose the supportable reverse link data rate is 50 kbps. According to Table 3, the highest preset data rate in EVDO Rev. 0 (for the reverse link) that does not exceed the supportable data rate would be 38.4 kbps. Thus, the maximum reverse link data rate would be selected as 38.4 kbps.

The femtocell base station controls the mobile station so as to prevent the mobile station from using a reverse link data rate that exceeds the maximum reverse link data rate, as indicated by block 404. This control can be achieved in different ways, depending on the particular reverse-link rate algorithm used by the mobile station.

For EVDO Rev. 0, the reverse-link data rate used by the mobile station may depend on a reverse activity bit (RAB) that the mobile station receives from the base station. The RAB provides an indication of the traffic load on the reverse link. If the traffic load exceeds a threshold, then the RAB is set to 1; otherwise it is set to 0. In a typical implementation, the mobile station receives the RAB and consults a probability table to determine a probability of increasing the reverse-link data rate for the next frame (if RAB=0) or a probability of decreasing the reverse-link data rate for the next frame (if RAB=1). In particular, for RAB=0, the table provides a probability, $p_i$, for increasing the reverse-link data rate from $R_i$ to $R_{i+1}$. Thus, to make sure that the mobile station does not use a reverse-link data rate that exceeds the maximum reverse-link data rate, the femtocell may specify a probability of 0 for increasing the reverse-link data rate above the maximum reverse-link data rate.

For EVDO Rev. A, the mobile station may use a T2P algorithm to select various transmission parameters, such as packet size and transmission duration, that translate into an effect reverse-link data rate. In that case, the femtocell base station may change the mappings used in the T2P algorithm, so that the transmission parameters that are selected do not result in any reverse-link data rate that exceeds that maximum reverse-link data rate.

In this way, the forward-link rate algorithm and/or reverse-link rate algorithm used by a mobile station may be adjusted by a base station in order to compensate for the base station's limited backhaul capacity. It is to be understood, however, that the mobile station may apply the adjusted rate algorithms when being served by a backhaul-limited base station (such as a femtocell base station) but may apply default rate algorithms when being served by a base station that is not so limited (such as a femtocell base station).

Figure 6:
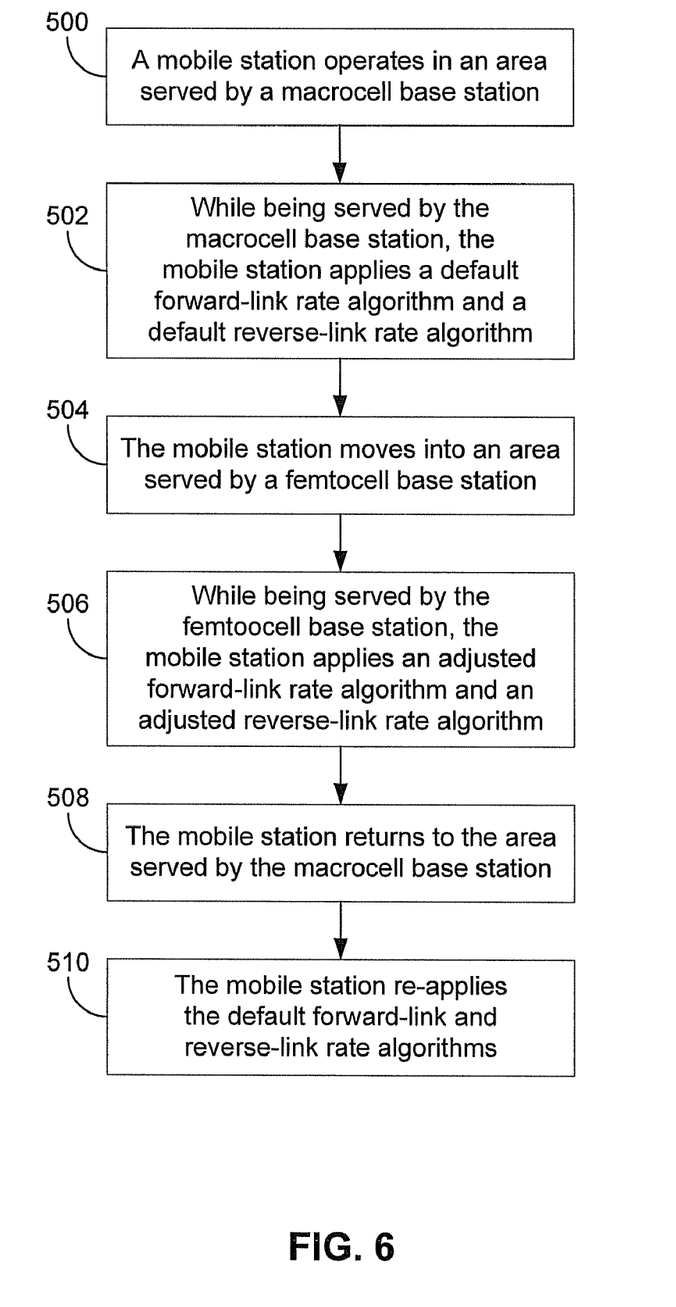
FIG. 6 is a flow chart for a method of applying different rate algorithms for different base stations, in accordance with an exemplary embodiment.

FIG. 6 illustrates an example in which a mobile station applies different rate algorithms when being served by different base stations. Initially, the mobile station operates in an area served by a macrocell base station (e.g., base station 12), as indicated by block 500. While being served by the macrocell base station, the mobile station applies a default forward-link rate algorithm and a default reverse-link rate algorithm, as indicated by block 502. The default algorithms may allow the mobile station to request the highest forward-link data rate and to use the highest reverse-link data rate supported by the particular wireless protocol governing the communications between the mobile station and the base station (e.g., EVDO Rev. 0 or EVDO Rev. A).

At some point, the mobile station moves into an area served by a femtocell base station (e.g., base station 14), as indicated by block 504. In this example, the femtocell base station uses the same wireless protocol as the macrocell base station but has a more limited backhaul capacity.

While being served by the femtocell base station, the mobile station applies an adjusted forward-link data rate and an adjusted reverse-link rate algorithm, as indicated by block 506. The adjusted algorithms limit the forward-link and reverse-link data rates based on the backhaul capacity of the femtocell base station. For example, the adjusted forward-link rate algorithm may include an adjusted mapping between DRC values and forward link data rates so that only a subset of the preset data rates specified in the wireless protocol are available. As discussed above, the subset may include only those preset data rates that are less than or equal to a maximum forward link data rate (which, in turn, may be selected based on the base station's limited backhaul capacity).

The adjusted algorithms could be controlled by the femtocell base station. For example, the femtocell base station may send one or more control signals that cause the mobile station to apply the adjusted forward-link and reverse-link rate algorithms. In one approach, a control signal may specify the maximum forward link data rate and the maximum reverse link data rate, and the mobile station may adjust its algorithms based on these maximum data rates. In another approach, a control signal may specify new mappings for the algorithms (e.g., new mappings between DRC values and forward link data rates). In still other approaches, a control signal may provide other information that causes the mobile station to apply adjusted algorithms.

Alternatively, the mobile station might apply the adjusted algorithms without being so instructed by the femtocell base station. For example, the mobile station may recognize that the femtocell base station is backhaul-limited (e.g., based on the base station's identifying information) and responsively apply appropriately limited rate algorithms.

The mobile station may subsequently return to the area served by the macrocell base station, as indicated by block 508. In that case, the mobile station may re-apply the default forward-link and reverse-link rate algorithms, as indicated by block 510.

In this way, a mobile station may use different forward-link and/or reverse-link rate algorithms when being served by different base stations, in order to compensate for the base stations' differing backhaul capacities.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a wireless communication system in which a base station transmits data to a mobile station at forward link data rates that are requested by said mobile station, wherein said mobile station stores a mapping between a plurality of forward-link rate indices and a plurality of preset forward link data rates and said mobile station requests one of said preset forward link data rates by transmitting its corresponding forward-link rate index to said base station, said base station being communicatively coupled to a packet-switched network via a backhaul connection, said method comprising:

determining a capacity of said backhaul connection;

selecting a maximum forward link data rate based on said capacity, wherein selecting a maximum forward link data rate based on said capacity comprises (i) determining a supportable data rate based on said capacity, (ii) identifying, from among said plurality of preset forward link data rates, a highest preset forward link data rate that is less than or equal to said supportable data rate, and (iii) selecting said highest preset forward link data rate as said maximum forward link data rate; and said base station defining a revised mapping in said mobile station, wherein said revised mapping does not include any of said preset forward link data rates that exceed said maximum forward link data rate.

2. The method of claim 1, wherein said base station is a femtocell base station.

3. The method of claim 1, wherein said backhaul connection comprises a digital subscriber line (DSL) modem or cable modem.

4. The method of claim 1, wherein determining a capacity of said backhaul connection comprises:

said base station exchanging test packets with a test server via said backhaul connection.

5. The method of claim 1, wherein said preset forward link data rates are EVDO forward link data rates and said forward-link rate indices are data rate control (DRC) values.

6. The method of claim 1, further comprising:

said mobile station measuring a signal strength of a signal transmitted by said base station to obtained a measured signal strength;

said mobile station selecting a forward-link rate index based, at least in part, on said measured signal strength, said forward-link rate index corresponding, in accordance with said revised mapping, to a preset forward link data rate that is less than or equal to said maximum forward link data rate; and said mobile station transmitting said forward-link rate index to said base station to request said preset forward link data rate.

7. The method of claim 1, further comprising:

selecting a maximum reverse link data rate based on said capacity; and said base station controlling said mobile station to prevent said mobile station from transmitting data to said base station at a reverse link data rate that exceeds said maximum reverse link data rate.

8. A method for a mobile station, said method comprising:

while being served by a first base station having a first backhaul capacity, said mobile station applying a first forward-link algorithm for selecting a forward link data rate from among a first set of forward link data rates;

said mobile station moving into an area served by a second base station, said second base station having a second backhaul capacity that is less than said first backhaul capacity;

said mobile station receiving a control signal from said second base station; and in response to said control signal, said mobile station applying a second forward-link algorithm for selecting a forward link data rate from among a second set of forward link data rates, wherein said second set of forward link data rates is a subset of said first set of forward link data rates that compensates for said second backhaul capacity being less than said first backhaul capacity.

9. The method of claim 8, wherein said control signal identifies a maximum forward link data rate, and wherein said second set of forward link data rates does not include any forward link data rate that exceeds said maximum forward link data rate.

10. The method of claim 8, further comprising:
while being served by said first base station, said mobile station applying a first reverse-link algorithm for selecting, from among a first set of reverse link data rates, a reverse link data rate for transmitting data to said first base station; and
while being served by said second base station, said mobile station applying a second reverse-link algorithm for selecting, from among a second set of reverse link data rates, a reverse link data rate for transmitting data to said second base station, said second set of reverse link data rates being a subset of said first set of reverse link data rates.

11. The method of claim 10, further comprising:
said mobile station applying said second reverse-link algorithm in response to said control signal.

12. The method of claim 11, wherein said control signal identifies a maximum reverse link data rate, and wherein said second set of reverse link data rates does not include any reverse link data rate that exceeds said maximum reverse link data rate.

13. A base station, comprising:
a transceiver, wherein said transceiver is configured to transmit forward-link data to a mobile station at forward link data rates requested by said mobile station and to receive reverse-link data transmitted by said mobile station at reverse link data rates, wherein said forward link data rates requested by said mobile station are any of a plurality of preset forward link data rates that are requested by corresponding forward-link rate indices transmitted by said mobile station;
a backhaul interface, wherein said backhaul interface is configured to receive said forward-link data via a backhaul connection and to transmit said reverse-link data via said backhaul connection;
a backhaul compensator, wherein said backhaul compensator is configured to determine a capacity of said backhaul connection and said backhaul compensator is configured to select a maximum forward link data rate based on said capacity by a process comprising (i) determining a supportable data rate based on said capacity, (ii) identifying, from among said plurality of preset forward link data rates, a highest preset forward link data rate that is less than or equal to said supportable data rate, and (iii) selecting said highest preset forward link data rate as said maximum forward link data rate; and
an air interface control function, wherein said air interface control function is configured to signal said mobile station via said transceiver, so as to prevent said mobile station from requesting forward link data rates that exceed said maximum forward link data rate.

14. The base station of claim 13, wherein said backhaul compensator is further configured to select a maximum reverse link data rate based on said capacity.

15. The base station of claim 14, wherein said air interface control function is further configured to control said mobile station to prevent said mobile station from transmitting at reverse link data rates that exceed said maximum reverse link data rate.

16. The base station of claim 13, wherein said transceiver provides a femtocell wireless coverage area.

17. The base station of claim 13, wherein said backhaul connection comprises a digital subscriber line (DSL) modem or cable modem.

18. The base station of claim 13, wherein said backhaul compensator is configured to determine said capacity of said backhaul connection by a process comprising exchanging test packets with a test server via said backhaul connection.

19. The base station of claim 13, wherein said preset forward link data rates are EVDO forward link data rates and said forward-link rate indices are data rate control (DRC) values.

* * * * *